United States Patent
Beals (10) Patent No.: US 10,452,870 B2
(45) Date of Patent: Oct. 22, 2019

(54) SMART CARD AUTHENTICATED DOWNLOAD

(71) Applicant: DISH Technologies L.L.C., Englewood, CO (US)

(72) Inventor: William Michael Beals, Englewood, CO (US)

(73) Assignee: DISH Technologies LLC, Englewood, CO (US)

( * ) Notice: Subject to any disclaimer, the term of this patent is extended or adjusted under 35 U.S.C. 154(b) by 84 days.

(21) Appl. No.: 15/370,927

(22) Filed: Dec. 6, 2016

(65) Prior Publication Data

US 2018/0157865 A1 Jun. 7, 2018

(51) Int. Cl.
| | |
|---|---|
| H04L 29/06 | (2006.01) |
| G06F 21/64 | (2013.01) |
| G06F 8/65 | (2018.01) |
| H04L 9/08 | (2006.01) |
| H04L 9/06 | (2006.01) |

(Continued)

(52) U.S. Cl.
CPC ............... *G06F 21/64* (2013.01); *G06F 8/60* (2013.01); *G06F 8/65* (2013.01); *H04L 9/0643* (2013.01); *H04L 9/0861* (2013.01); *H04L 9/3236* (2013.01); *H04L 63/0428* (2013.01); *H04L 63/0435* (2013.01); *H04L 63/123* (2013.01); *H04N 21/42623* (2013.01); *H04N 21/435* (2013.01); *H04N 21/818* (2013.01)

(58) Field of Classification Search
CPC ...................................................... G06F 21/64
See application file for complete search history.

(56) References Cited

U.S. PATENT DOCUMENTS 5,768,539 A * 6/1998 Metz ........................ G06F 8/60
348/E5.006
6,219,787 B1 * 4/2001 Brewer ..................... G06F 8/52
713/165

(Continued)

FOREIGN PATENT DOCUMENTS

| EP | 1 688 834 A2 | 8/2006 |
| EP | 2 299 692 A1 | 3/2011 |
| WO | 2007/146763 A2 | 12/2007 |

OTHER PUBLICATIONS

International Search Report and Written Opinion for PCT/US2017/068167 dated Apr. 17, 2018, all pages.

(Continued)

*Primary Examiner* — Matthew T Henning (57) ABSTRACT

Systems and methods provide a targeted and secure software image or other data to a television receiver. The data item can be provided to the smart card through a television service provider distribution system in blocks of data that are small enough to be processed by the smart card. For each block of data, the smart card can decrypt the block of data with a global network key, generate a partial hash representing the block of data, update a full hash with the partial hash, encrypt the block of data with a dynamically generated item key, and transmit the encrypted block of data to the television receiver. Once complete, the smart card can security check the software image including an integrity check using the full hash. If the security check passes, the smart card can transmit the dynamically generated item key to the television receiver.

20 Claims, 5 Drawing Sheets

(51) Int. Cl.
*G06F 8/60* (2018.01)
*H04L 9/32* (2006.01)
*H04N 21/426* (2011.01)
*H04N 21/435* (2011.01)
*H04N 21/81* (2011.01)

(56) References Cited

U.S. PATENT DOCUMENTS

| | | | |
|---|---|---|---|
| 6,651,250 B1* | 11/2003 | Takai | H04H 20/74 348/E5.108 |
| 6,779,198 B1* | 8/2004 | Morinaga | H04N 21/4147 348/423.1 |
| 8,385,542 B2 | 2/2013 | Beals | |
| 8,613,081 B2 | 12/2013 | Beals | |
| 8,844,816 B2 | 9/2014 | Beals | |
| 9,043,902 B2 | 5/2015 | Beals et al. | |
| 10,171,870 B2 | 1/2019 | Beals | |
| 2002/0099948 A1* | 7/2002 | Kocher | G06Q 20/367 713/194 |
| 2003/0030581 A1* | 2/2003 | Roy | H04B 7/18508 342/36 |
| 2003/0084440 A1* | 5/2003 | Lownes | G06F 8/65 725/6 |
| 2003/0108199 A1* | 6/2003 | Pinder | H04N 5/913 380/200 |
| 2003/0126400 A1 | 7/2003 | Debiez et al. | |
| 2003/0219127 A1 | 11/2003 | Russ et al. | |
| 2005/0226170 A1 | 10/2005 | Relan et al. | |
| 2006/0107285 A1 | 5/2006 | Medvinsky | |
| 2006/0161969 A1 | 7/2006 | Moreillon | |
| 2006/0272022 A1 | 11/2006 | Loukianov et al. | |
| 2007/0005506 A1 | 1/2007 | Candelore | |
| 2007/0180464 A1 | 8/2007 | Dellow et al. | |
| 2007/0294178 A1* | 12/2007 | Pinder | G06F 21/10 705/57 |
| 2008/0022299 A1 | 1/2008 | Le Buhan | |
| 2008/0282345 A1 | 11/2008 | Beals | |
| 2009/0019061 A1 | 1/2009 | Scannell, Jr. | |
| 2009/0049220 A1 | 2/2009 | Conti | |
| 2009/0157936 A1 | 6/2009 | Goss | |
| 2009/0168996 A1 | 7/2009 | Candelore | |
| 2009/0172806 A1 | 7/2009 | Natu | |
| 2010/0169368 A1 | 7/2010 | Neill | |
| 2011/0017825 A1* | 1/2011 | Beals | G06K 7/0021 235/441 |
| 2011/0138164 A1 | 6/2011 | Hoon et al. | |
| 2012/0120250 A1 | 5/2012 | Shintani et al. | |
| 2012/0321080 A1* | 12/2012 | Candelore | H04N 21/42623 380/201 |
| 2012/0321280 A1 | 12/2012 | Lin | |
| 2013/0279694 A1 | 10/2013 | Gremaud et al. | |
| 2014/0282685 A1 | 9/2014 | Beals et al. | |
| 2015/0040155 A1 | 2/2015 | Gutta et al. | |
| 2016/0050190 A1 | 2/2016 | Mooij et al. | |
| 2018/0184158 A1 | 6/2018 | Beals | |
| 2018/0184159 A1 | 6/2018 | Beals et al. | |
| 2018/0184176 A1 | 6/2018 | Beals et al. | |
| 2018/0184177 A1 | 6/2018 | Beals et al. | |

OTHER PUBLICATIONS

CI Plus Specification v1.3. Content Security Extensions to the Common Interface., Jan. 14, 2011, XP055030907, Retrieved from the Internet: URL:http://www.ci-plus.com/data/ci-plus_specification_v1.3.pdf [retrieved on Jun. 25, 2012] p. 1-p. 25.
International Search Report and Written Opinion for PCT/US2017/068150 dated Feb. 22, 2018, all pages.
International Search Report and Written Opinion for PCT/US2017/062756 dated Feb. 28, 2018, all pages.
International Search Report and Written Opinion for PCT/US2017/068173 dated Mar. 9, 2018, all pages.
International Search Report and Written Opinion for PCT/US2017/068163 dated Mar. 26, 2018, all pages.
Silberschatz A. et al., "Operating System Concepts—Fourth Edition", Operating System Concepts, No. ed.4, Jan. 1, 1994, pp. 28-35, XP002328940, the whole document.
U.S. Appl. No. 15/394,537, filed Dec. 29, 2016 Non-Final Rejection dated Nov. 28, 2017, all pages.
U.S. Appl. No. 15/394,537, filed Dec. 29, 2016 Notice of Allowance dated Sep. 11, 2018, all pages.
U.S. Appl. No. 15/474,907, filed Mar. 30, 2017 Non-Final Rejection dated Jan. 7, 2019, all pages.
U.S. Appl. No. 15/474,903, filed Mar. 30, 2017 Non-Final Rejection dated Jan. 10, 2019, all pages.
U.S. Appl. No. 15/474,893, filed Mar. 30, 2017 Non-Final Rejection dated Oct. 29, 2018, all pages.
U.S. Appl. No. 15/474,893, filed Mar. 30, 2017 Notice of Allowance dated Feb. 8, 2019, all pages.
International Preliminary Report on Patentability for PCT/US2017/068167 dated Jun. 25, 2019, all pages.
International Preliminary Report on Patentability for PCT/US2017/068150 dated Jun. 25, 2019, all pages.
International Preliminary Report on Patentability for PCT/US2017/068173 dated Jul. 2, 2019, all pages.
International Preliminary Report on Patentability for PCT/US2017/068163 dated Jun. 25, 2019, all pages.

* cited by examiner

SMART CARD AUTHENTICATED DOWNLOAD

CROSS-REFERENCES TO RELATED APPLICATIONS

This application is related to co-pending application Ser. No. 62/438,902, entitled SECURITY CPU STRONG ACTIVATION CODE. This application is further related to co-pending application Ser. No. 62/438,903, entitled STRONG AUTHENTICATION OF CLIENT SET TOP BOXES. This application is further related to co-pending application Ser. No. 62/438,908, entitled STRONG CRYPTOGRAPHIC BETWEEN SMART CARD AND CLIENT SET TOP BOXES. This application is further related to co-pending application Ser. No. 62/439,850, entitled FORCED EXECUTION OF AUTHENTICATED CODE.

BACKGROUND OF THE INVENTION

Clients of television providers typically receive their television and related services using a television receiver. Such a television receiver contains software that may need updating on occasion. The television provider may wish to target specific software updates to certain clients and provide the software image in a secure manner. Currently, there is no reliable way to provide targeted and/or secure software updates to television receivers via a television service provider distribution network because the smart card, which controls security on such a television receiver, does not have sufficient memory to hold an entire software image and process the software image to check the integrity or intended recipient of the software image. The following disclosure addresses a solution for providing such capability.

BRIEF SUMMARY OF THE INVENTION

This application describes systems and methods for providing a targeted and secure data item to a television receiver. In some embodiments, a smart card coupled with the television receiver can receive the data item. The data item can be received in blocks of data, each of which is processed individually. The data blocks are processed by decrypting the block of data with a global network key, generating a partial hash representing the block of data, updating the full hash with the partial hash, encrypting the block of data with a dynamically generated item key, and transmitting the encrypted block of data to the television receiver. After the entire data item is processed, the full hash can be used as part of a security check of the data item. If the security check passes, the dynamically generated item key can be transmitted to the television receiver.

Optionally, the data item is a software image. Optionally, the smart card can determine whether the software image is a most recent version. Optionally, the software image can be a software update to be installed on the television receiver.

Optionally, if the security check fails, the smart card may not transmit the dynamically generated item key to the television receiver. Optionally, the security check can include checking that the software update is intended for the television receiver. Optionally, the security check can include a signature check that the data item is from a known source. Optionally, the security check can include an integrity check that the data item is not corrupt and has not been tampered with.

Optionally, the blocks of data can be received one at a time and each block of data can be processed before receiving the next block. Optionally, multiple blocks of data can be processed in parallel.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Many television subscribers receive their television through a television service provider. These television subscribers typically have a television receiver that receives a television service provider signal that provides the stream of viewing content. In addition to providing content through the television service provider signal, television providers can provide other data to the television receiver, including software updates for the television receiver, via the television service provider signal. The content and other information provided to a television receiver can be processed through a smart card. The smart card can control the data that is passed to the television receiver and otherwise control security by unencrypting the data or content and, optionally, re-encrypting the data with a local key that can be provided to the television receiver or already known to the television receiver. Such encryption and re-encryption can be implemented to maintain the integrity of the television receiver and thwart signal thieves. One constraint of smart cards, however, is limited memory space. Because software updates are typically much too large in size to store on a smart card, the smart card cannot process the entire software image at once. Often, a software image for an update to a television receiver is many megabytes in size, while the memory available on a smart card for storing the software image during processing is less than one (1) megabyte in size. For that reason, in the past, software images sent to television receivers have not been processed through a smart card and are therefore not encrypted or otherwise secured, and television service providers have not had the ability to target a specific television receiver with the software image.

The following description provides systems and methods for controlling delivery of a software image or other data through a smart card that can be targeted to a specific television receiver as well as encrypted so that it is secure.

Figure 1:
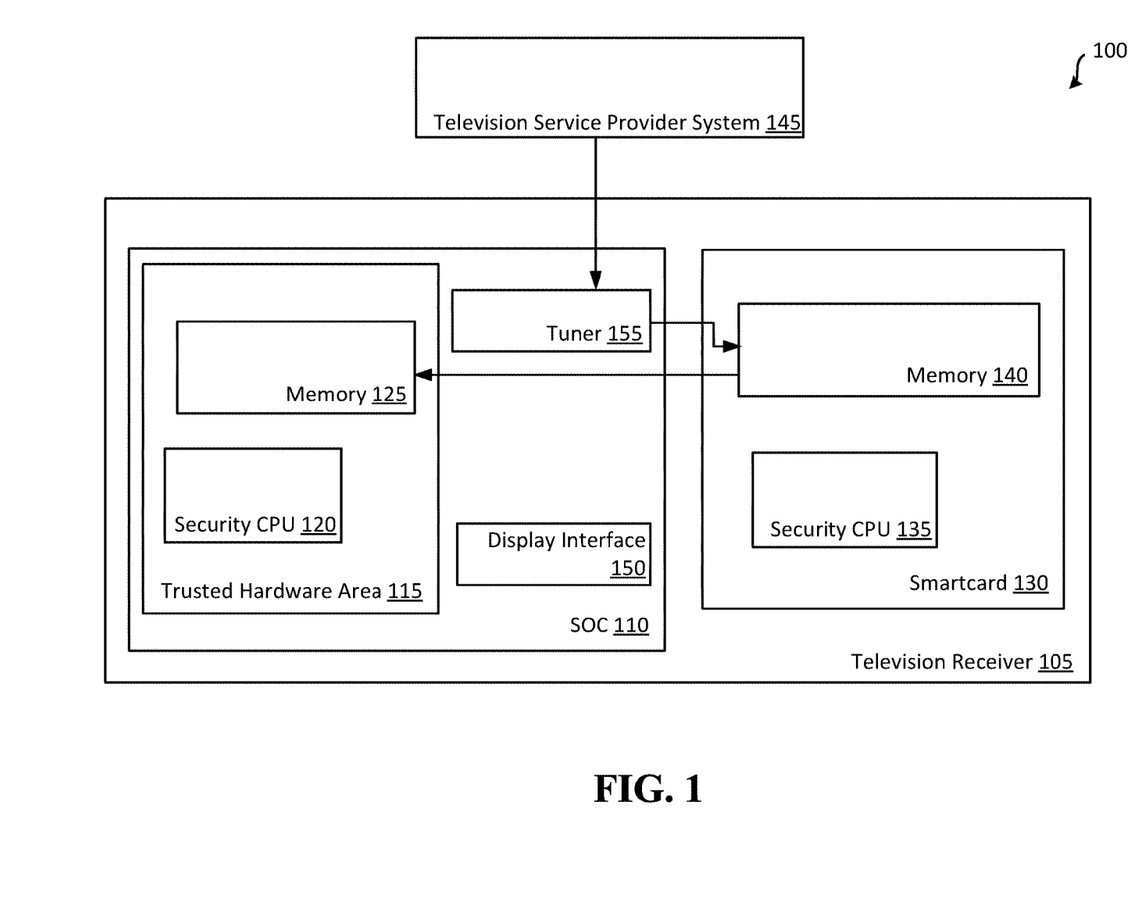
FIG. 1 illustrates an embodiment of a system for providing a secure and targeted data item to a television receiver.

FIG. 1 illustrates an embodiment of a television service system 100. The television service system 100 can include a television service provider system 145 and a television receiver 105. The television receiver 105 can include a system on a chip ("SOC") 110 and a smart card 130. The smart card 130 can include a security central processing unit ("CPU") 135 and memory 140. The SOC 110 can include tuner 155, display interface 150, and trusted hardware area 115, which can include security CPU 120 and memory 125. Additionally, television receiver 105 can include one or more of the following, which are not shown: a control processor, a tuning management processor, tuner, a network interface, an EPG database, a digital video recorder ("DVR") database, an on-demand programming database, a home automation settings database, a home automation script database, a remote control interface, and/or a descrambling engine. In other embodiments of television receiver 105, fewer or greater numbers of components may be present. It should be understood that the various components of television receiver 105 may be implemented using hardware, firmware, software, and/or some combination thereof.

Figure 4:
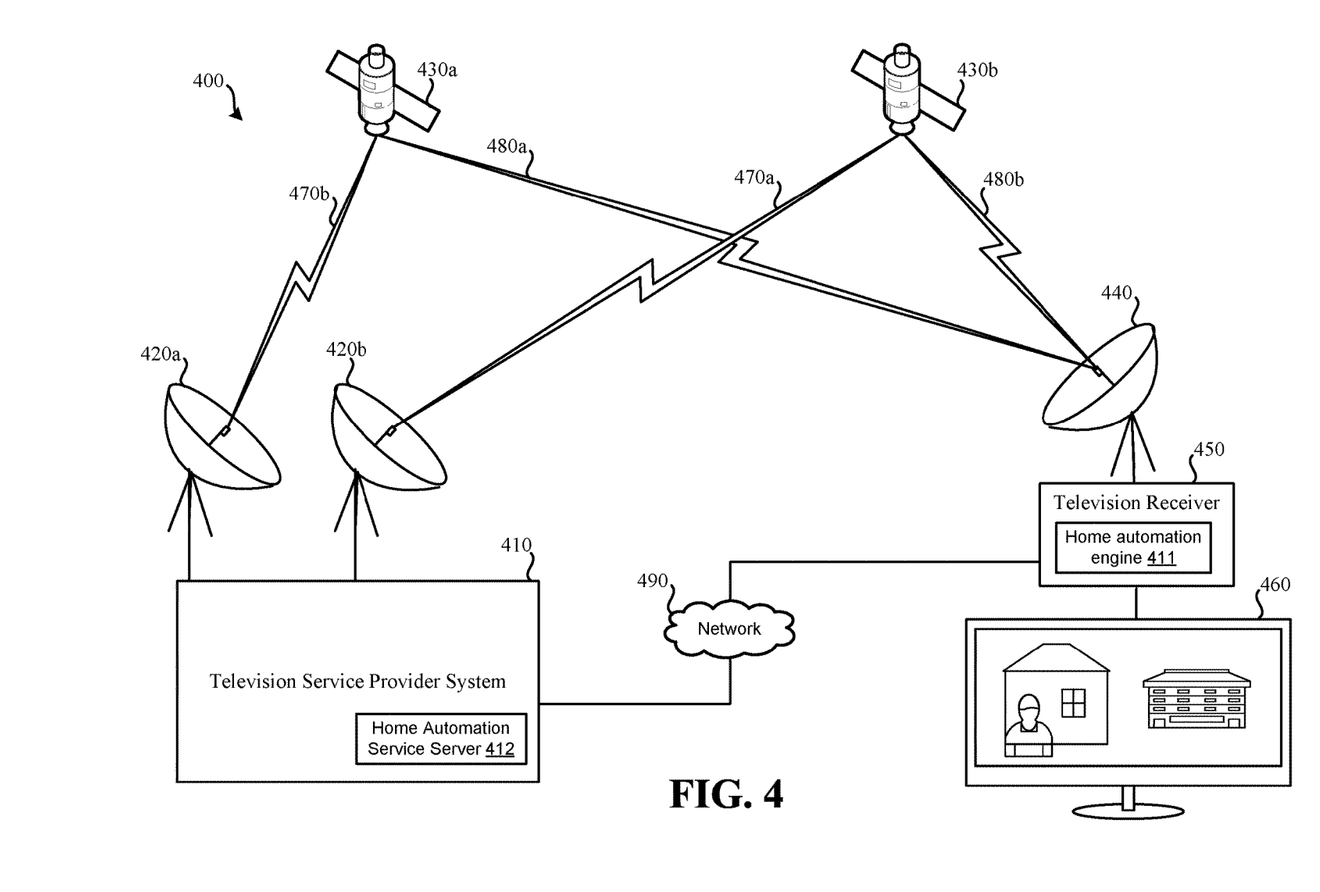
FIG. 4 illustrates an embodiment of a television service provider system.

Television service provider system 145 can be the source of the television service and can be, for example, television service provider system 410 described in FIG. 4. Television service provider system 145 can communicate with television receiver 105, including transmitting content and other data, including software images, to television receiver 105. Television service provider system 145 can communicate with television receiver 105 via any suitable network, including satellite as described in FIG. 4. The data transmitted from television service provider system 145 can be transmitted to television receiver 105 and be processed through smart card 130 for decryption and authorization as described in more detail herein.

Television receiver 105 may be configured to function as a host for a home automation system either alone or in conjunction with a communication device. Television receiver 105 may be in the form of a separate device configured to be connected with a display device, such as a television. Embodiments of television receiver 105 can include set-top boxes ("STBs"). In addition to being in the form of an STB, a television receiver may be incorporated as part of another device, such as a television, other form of display device, video game console, computer, mobile phone or tablet, or the like. For example, a television may have an integrated television receiver, which does not involve an external STB being coupled with the television.

Television receiver 105 can be, for example, television receiver 450 described in FIG. 4. Television receiver 105 can include a receiving slot into which smart card 130 can be inserted. The receiving slot can include, for example, contact points. Smart card 130 can include contact points that line up with the contact points within television receiver 105 such that when smart card 130 is inserted into television receiver 105, a communication link between smart card 130 and television receiver 105 can be created. Any suitable coupling mechanism can be used to create a communication link between smart card 130 and television receiver 105. While only one television receiver 105 is depicted in FIG. 1, any number (tens, hundreds, thousands) of authorized receiving devices can receive broadcasts from television service provider system 145 as part of the television service system 100.

Smart card 130 can be any suitable smart card. Smart card 130 can be provided to the television subscriber by, for example, a television service provider. Smart card 130 can be trusted because smart card 130 is designed to do only security. As such, memory 140 and security CPU 135 are trusted hardware. Further, if security on smart card 130 is compromised, smart card 130 can be replaced without replacing the entire television receiver 105. Memory 140 can include, for example, instructions that the security CPU 135 can execute to perform various functions specific to smart card 130. For example, memory 140 can include instructions to decrypt data sent from television service provider system 145 using the global network key, which can be stored within memory 140.

Memory 140 can also include instructions for encrypting data with a local key. There are two different types of local keys that can be used to encrypt data before transmission of the data to television receiver 105. The first local key can be a hardware local key. The hardware local key is a static (i.e., does not change) key that is programmed at chip manufacturing for the SOC 110. Optionally, the hardware local key can be programmed at television receiver manufacturing or some other suitable time. The hardware local key is known only to the television service provider, the security CPU 120, and the smart card 130. The second type of local key is a dynamically generated item key. The dynamically generated item key is a key that is generated dynamically by the smart card 130 for encrypting the software image (or other data for transmission to the television receiver 105). Memory 140 can include instructions for generating the dynamically generated item key specific to the television receiver 105, encrypting the dynamically generated item key with the hardware local key, and transmitting the software image or other data (encrypted with the dynamically generated item key) as well as the dynamically generated item key (encrypted with the hardware local key) to security CPU 120. Memory 140 can also include instructions for generating the dynamically generated item key such that the dynamically generated item key is unique for each session (e.g., each new software image or set of packets associated with a single data item). Stated differently, each session can utilize a new dynamically generated item key generated specifically for that item of data and for television receiver 105. Memory 140 can also include information that specifies the content allowed or intended for television receiver 105. Further, memory 140 can include a unique identifier for smart card 130, which can be used for authorization and pairing smart card 130 to television receiver 105 as described in more detail below. Memory 140 can be any size memory, however, memory on a smart card is typically limited due to physical size constraints. Security CPU 135 can be any suitable processor configured to execute only trusted instructions stored on memory 140.

SOC 110 can include tuner 155, display interface 150, and trusted hardware area 115. Trusted hardware area 115 can include memory 125 and security CPU 120. Security CPU 120 can be any suitable processor (i.e., CPU) configured to execute only trusted instructions stored on memory 125. Memory 125 can include, for example, instructions that security CPU 120 can execute to perform various functions specific to television receiver 105. For example, memory 125 can include instructions to decrypt data sent from smart card 130. Additionally, SOC 110 can have a unique identifier and a set of secrets, which can be stored in memory 125. Memory 125 can be any size memory.

Display interface 150 can serve to output a signal to a television or another form of display device in a proper format for display of video and playback of audio. As such, display interface 150 can output one or more television channels, stored television programming (e.g., television programs from a DVR database or television programs from on-demand programming and/or information from an EPG database), to a television for presentation. SOC 110 can further include other components not shown and described above to control home automation, DVR functionality, and the like.

Tuner 155 may include one or more tuners used to tune to transponders that include broadcasts of one or more television channels or transmission of other data, such as software images. Such tuners may be used also to receive for storage on-demand content and/or addressable television commercials. In some embodiments, two, three, or more than three tuners may be present, such as four, six, or eight tuners. Each tuner contained in tuner 155 may be capable of receiving and processing a single transponder stream from a satellite transponder or from a cable network at a given time. As such, a single tuner may tune to a single transponder stream at a given time. If tuner 155 includes multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuner 155 may be used to receive the signal containing the multiple television channels for presentation and/or recording. Tuner 155 may receive commands from a tuning management processor (not shown), which can instruct tuner 155 to which frequencies are to be tuned.

In use, data transmitted to television receiver 105 from television service provider system 145 can be encrypted with a global network key. This global network key system can prevent signal thieves from stealing content and other data provided to television receiver 105. For signature verification purposes, the smart card 130 within television receiver 105 on the television service system 100 can know the global public signature key to verify signatures, but does not have the global private signature key, so not even a compromised smart card can sign data for other devices since it does not have the global private signature key. As described in more detail herein, local keys can be used by the authorized decrypting devices (e.g., smart card 130) to maintain a high level of security with the television receivers, ensuring that the content and other data transmitted to television receiver 105 remains secure and can only be decrypted by the specific television receiver (e.g., television receiver 105) to which it was transmitted and for which the local key was generated. It is impractical, however, to encrypt each transmission separately for each television receiver and, therefore, a global network key is necessary at the television service provider transmission level.

The SOC 110 unique identifier and the smart card 130 unique identifier can be used to pair (also called marrying) the television receiver 105 to smart card 130. When a television subscriber receives a television receiver 105 and smart card 130, the television subscriber can put the smart card 130 into the television receiver 105 and power up the television receiver 105. Once powered on, the television receiver can transmit the unique identifiers of the smart card 130 and the SOC 110 to the television service provider system 145 with a request for authentication. In response, the television service provider system 145 can provide an authentication message. The authentication message can provide authorization for the pairing by providing the hardware local key and set of secrets of SOC 110 to smart card 130. Once smart card 130 has the SOC 110 set of secrets, smart card 130 can generate dynamically generated item keys using the set of secrets specifically for television receiver 105 for encrypting data transmitted to television receiver 105 that cannot be decrypted by any other television receiver.

Once pairing is complete, television service provider system 145 can transmit or broadcast a signal, which can be received by tuner 155 and transmitted to smart card 130. Smart card 130 can store the data transmitted in the signal in memory 140. Because memory 140 can be limited in size, the data sent by television service provider system 145 can be received in a stream or in data blocks that are sufficiently small to be stored in memory 140. For example, the data can be a block of data of a software image. The data can be encrypted. Security CPU 135 can decrypt the data using a global network key. This global network key is necessary for bandwidth reasons from the television service provider system 145 as it is impractical to uniquely encrypt the data for each television receiver 105. Security CPU 135 can generate an incremental hash of the software image as each block of data is received. Security CPU 135 can calculate a partial hash of the block of data and update a full hash with the partial hash, so that a complete software image hash is generated and stored in memory 140. Security CPU 135 can generate a randomly generated item key to encrypt the block of data and transmit the block of data encrypted with the dynamically generated item key to security CPU 120. The advantage of the dynamically generated item key is that it is unique for every download for every television receiver 105, so even if the dynamically generated item key is compromised in one television receiver 105, the dynamically generated item key has no value to other smart cards or television receivers. Smart card 130 can receive, decrypt, hash, re-encrypt with the dynamically generated item key, and transmit to security CPU 120 each block of the software image until the entire software image is processed.

Security CPU 135 can perform a security check of the complete software image to confirm the integrity of the data. For example, the security check can include a signature check. The signature check can ensure that the software image was transmitted from a known source (e.g., television service provider system 145). The signature check is performed by using the global public signature key to verify the signature on the software image, which confirms the trusted source because the global public signature key can only verify the signature of data signed with the global private signature key. The global private signature key is only known by trusted sources, such as the television service provider system 145. The security check can also include an integrity check. The integrity check can be performed by comparing the full hash against a hash transmitted with the software image. If the hashes match, the integrity check can pass because the only way to get matching hashes is to hash the same data. This can ensure that the data received by the smart card is not corrupt and has not been tampered with since being transmitted by the trusted source. The security check can also confirm that the data is intended for the television receiver 105. For example, the smart card 130 can know what software the television receiver 105 is entitled to. Smart card 130 can confirm authorization of software much as it can confirm authorization of content (e.g., HBO, Cinemax, and so forth). Note that the order of the signature check, the integrity check, and the determining whether the data is intended for the television receiver 105 can be performed in any order.

Upon passing the security check, security CPU 135 can encrypt the dynamically generated item key with the hardware local key specific to television receiver 105. Security CPU 135 can then transmit the encrypted dynamically generated item key to security CPU 120. Upon receipt of the dynamically generated item key, security CPU 120 can decrypt the encrypted dynamically generated item key with the hardware local key (stored in memory 140 and unique to security SOC 110), and use the dynamically generated item key to decrypt the software image. Security CPU 120 can also security check the software image. For example, security CPU 120 can integrity check the software image by ensuring it is not corrupt and has not been tampered with since being transmitted from smart card 130. The integrity check can be performed by comparing the full hash transmitted with the software image against a hash calculated by security CPU 120. The security CPU 120 can signature check the software image as well because the security CPU 135 can sign the software image with a private local signature key specific to television receiver 105. Security CPU can use its public local signature key to check and confirm that the source of the software image is trusted. Upon passing the security check, security CPU 120 can execute the software image.

Note that while data transmitted from security CPU 135 to security CPU 120 may go through areas of television receiver 105 that are not as trusted as smart card 130 and trusted hardware area 115, the security of the data is ensured because security CPU 120 will not execute data that has been tampered with. Security CPU 120 is designed to recognize when data has been tampered with using the keys described above for encryption and signature checks and the hashes described for the integrity checks. Therefore, the integrity of the data that security CPU 120 executes is ensured. Security CPU 120 will not process the data or otherwise allow television receiver 105 to have or use the data if the data is not encrypted with a local key (i.e., dynamically generate item key or hardware local key for the television receiver SOC) or signed with a local signature key. Because security CPU 120 is within trusted hardware area 115, the enforcement of the security of the transmitted data is ensured by the trusted hardware. Because hardware enforcement of security is an order of magnitude more secure than software enforcement of security, the system is substantially less vulnerable to hacking than a system in which security were enforced with software and processors that are not in a trusted hardware portion of the television receiver.

Figure 2:
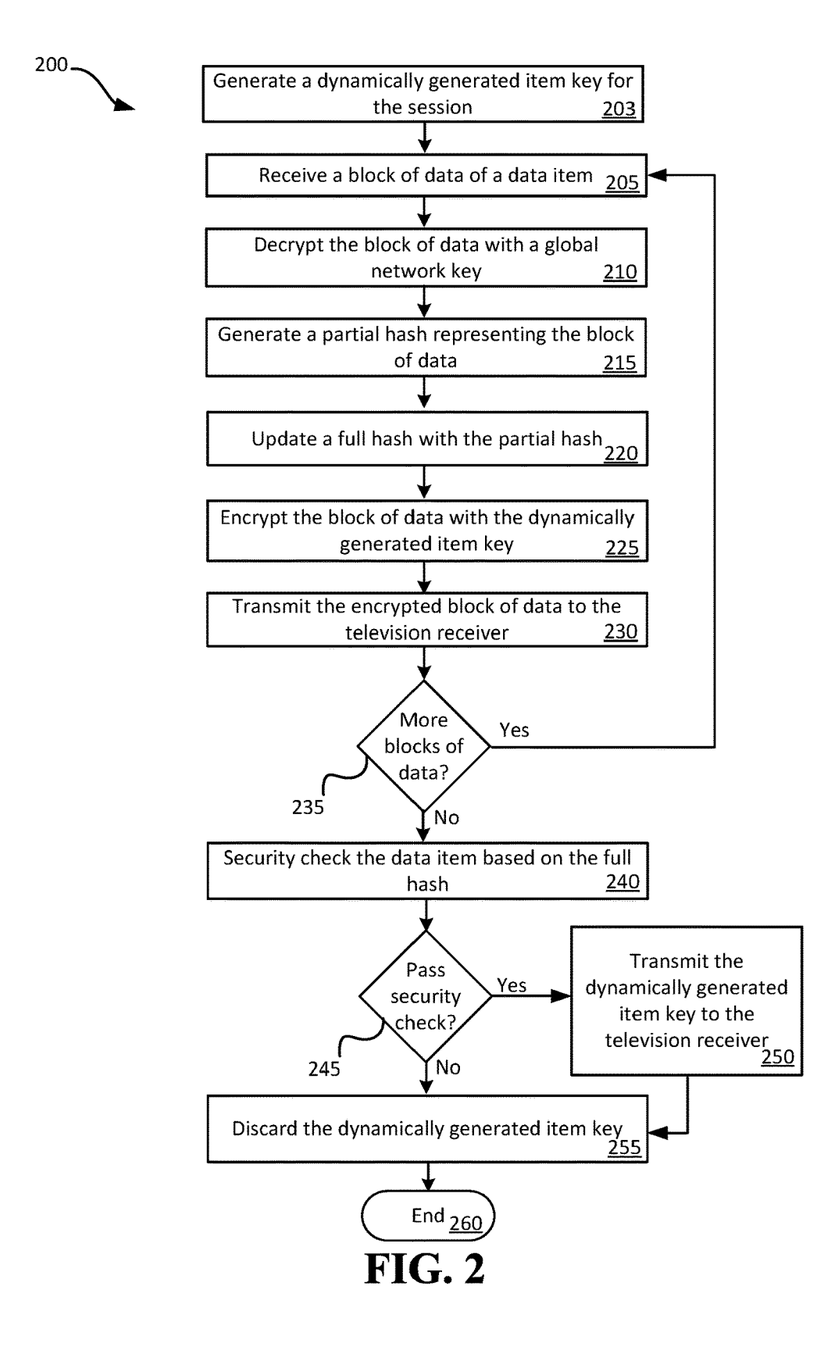
FIG. 2 illustrates a method for providing a secure and targeted data item to a television receiver.

FIG. 2 illustrates a method 200 for targeting and securing a data item to a television receiver. Method 200 can be performed by, for example, television service system 100 of FIG. 1. More specifically, method 200 can be performed by security CPU 135 on smart card 130 of FIG. 1. Method 200 can be a method that can be performed on each item of data (e.g., software image or other data that is too large to fit on the smart card without being broken into smaller blocks of data). Method 200 can begin at 203 with the smart card generating a dynamically generated item key for the session. The dynamically generated item key can be a key generated by the smart card for use with the data item. A new dynamically generated item key can be generated for use with each session (e.g., each software image and/or each item of data transmitted from the smart card to the television receiver). Stated differently, the dynamically generated item key can be a unique local key for the session and the television receiver. Using a unique local key for each session can further thwart signal thieves.

At 205, the smart card can receive a block of data of a data item. As discussed above, smart cards are typically memory constrained. An entire data item cannot typically fit on a smart card memory. Therefore, television service provider system 145 can transmit the data item in data blocks that are sufficiently small to be stored by memory 140, e.g., 100 kilobyte blocks. The data blocks are processed at 205, 210, 215, 220, 225, and 230 as described further herein. Each block of data can be processed individually. The blocks of data can be processed in sequence such that one block of data is completely processed before the next block is processed. Optionally, more than one block of data can be processed in parallel.

At 210, the smart card can decrypt the block of data with a global network key. The global network key can be a key that is known throughout the network by the trusted devices, such as smart cards in each television receiver. Such a global network key can thwart signal thieves from stealing content and data sent to the television receivers on the television service provider distribution network. Additionally, a signature check can be performed based on a global signature key because only trusted sources have the global private signature key needed to sign the data for signature verification by the global public signature key. Once decrypted, the block of data can be maintained in the smart card memory for further processing.

At 215, the smart card can generate a partial hash representing the block of data. When utilizing a full software image or data item, a cryptographic hash function can be used to generate a hash which can be used for an integrity check on the data item. The integrity check can confirm that the data is not corrupted or otherwise tampered with since transmitted from the trusted source. Because, however, the smart card receives one data block of the data item at a time, a partial hash, which represents just that block of data, can be generated. The partial hash can be generated using any suitable cryptographic hash function.

At 220, the smart card can update a full hash with the partial hash generated at 215. The full hash can be updated with the partial hash using any suitable combination method.

At 225, the smart card can encrypt the block of data with the dynamically generated item key generated at 203.

At 230, the smart card can transmit the block of data encrypted with the dynamically generated item key to a television receiver associated with the smart card. As described with respect to FIG. 1, the smart card can be inserted into a slot in a television receiver. The television receiver into which the smart card is inserted can be the television receiver to which the smart card transmits the block of data encrypted with the dynamically generated item key.

At 235, if there are no further blocks of data, the smart card can continue with 240. If there are additional blocks of data, the smart card can process each block of data as described above at 205, 210, 215, 220, 225, and 230.

At 240, when there are no more blocks of data to process, the smart card can security check the entire data item. The entire data item may not be stored on the smart card because, as discussed above, the smart card memory is typically insufficient to store the entire data item. Optionally, after transmitting each block of data at 230, the smart card can discard the block of data. However, the smart card can retain the full hash, which was generated as described above by incrementally updating the full hash with each partial hash generated from each block of data of the data item. As such, the full hash can be the hash that would be generated if the entire data item were hashed at one time. Alternatively, the full hash can be different than the hash that would be generated if the entire data item were hashed at one time depending on how the full hash is generated. Regardless of how the full hash is generated, it can represent the entire data item. As long as every component of the system generates the full hash in the same manner, the hash will be secure and will match.

The security check can include, for example, an integrity check of the full hash against a known value, for example against a hash that is passed with the data item to the smart card. For example, the first bits transmitted to the smart card from the television service provider system can be a value against which the full hash can be compared. As another example, the last bits transmitted to the smart card from the television service provider system can be a value against which the full hash can be compared. The bits transmitted for comparison can be the value of the hash calculated by the television provider and transmitted for the integrity check. The value can be calculated by the television provider in the same way as the smart card generates the full hash to ensure the values will be the same (e.g., the hash can be generated incrementally as described above). If the comparison passes, the integrity check can pass. The integrity check can confirm that the data item is not corrupt and that the data item has not been tampered with since transmission from the trusted source. Further, the security check can include, for example, a signature check. Specifically, because the television service provider system and other trusted sources should be the only systems that have the global private signature key for signing data that can be signature verified by the global public signature key, the smart card can signature verify the data item with the global public signature key and, if verified, know that the data was transmitted from the television service provider system or some other trusted source.

In addition, the smart card can determine whether the data item is intended for the television receiver. For example, the smart card can determine that the data item is a most recent version of a software image. Further, the smart card can determine that the software image is intended for the make and model of the television receiver. Determining whether the paired television receiver has authorization for the data item can be done much like the smart card would confirm authorization of the paired television receiver to receive television content. Determining whether the software image is intended for the television receiver can be part of the security check or performed separately from the security check.

At 245, the smart card can determine whether the security check passed. If the security check passed (e.g., the software image or data item is not corrupt, is intended for the television receiver, and is from a trusted source), the smart card can transmit the dynamically generated item key to the television receiver at 250. The dynamically generated item key can be encrypted with the hardware local key specific to the television receiver prior to transmitting the dynamically generated item key to ensure it is securely transmitted. If the security check failed, the smart card may not transmit the dynamically generated item key to the television receiver.

Transmission of the dynamically generated item key to the television receiver is required for the television receiver to make use of the data item that has been transmitted. Because the data item that has been transmitted has been encrypted with the dynamically generated item key, the data item is useless to the television receiver without the dynamically generated item key. And, the television receiver will not have the dynamically generated item key if the smart card does not provide it because the key is dynamically generated and unique to the television and the session. The television receiver cannot reproduce the dynamically generated item key; the television receiver can only obtain the key if the smart card transmits it. Therefore, if the smart card does not transmit the dynamically generated item key to the television receiver, the television receiver will not be able to decrypt the data item. In that case, the data item is useless to the television receiver, and the television receiver can discard the data item.

Further, if the dynamically generated item key and data item were provided to a different television receiver other than the targeted television receiver, the data item would be useless to that different television receiver because the dynamically generated item key is unique to the targeted television receiver and cannot be used by the different television receiver.

Optionally, the smart card can discard the dynamically generated item key upon failure of the security check at 255. Further, upon completion of the transmission of the dynamically generated item key to the television receiver, the smart card can discard the dynamically generated item key at 255. At 260, method 200 can end.

Figure 3:
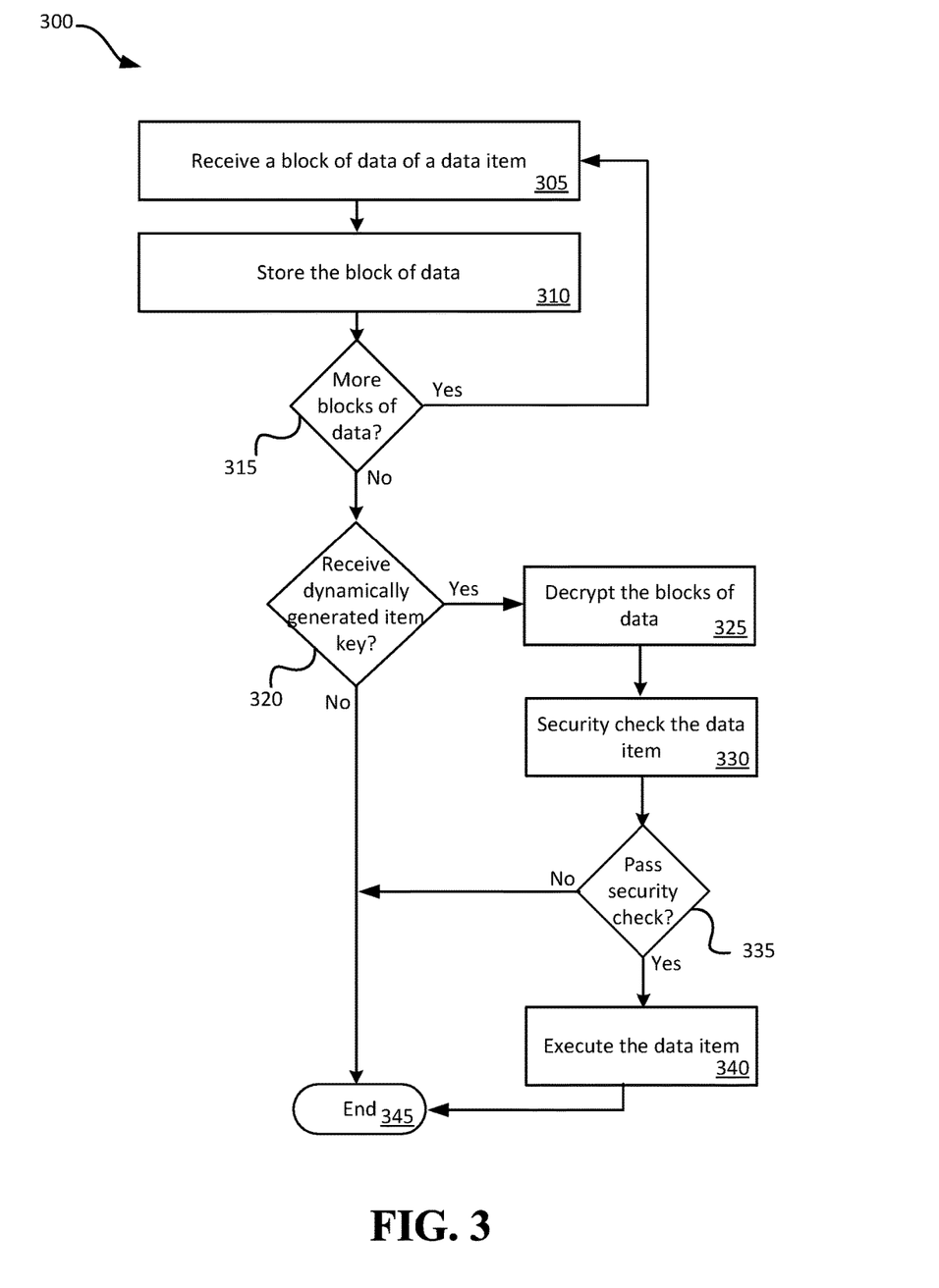
FIG. 3 illustrates another method for providing a secure and targeted data item to a television receiver.

FIG. 3 illustrates a method 300 for a television receiver to process a secured and targeted data item. Method 300 can be performed by, for example, television service system 100 of FIG. 1. More specifically, method 300 can be performed by security CPU 120 of FIG. 1. At 305, the security CPU can receive a block of data of the data item. The block of data can be the block of data encrypted with the dynamically generated item key as described in 225 of FIG. 2.

At 310, the security CPU can store the block of data in memory, for example memory 125 of FIG. 1. At 315, if more blocks of data are sent, security CPU can continue receiving and storing the blocks of data until the entire data item is received. The memory (e.g., memory 125 of FIG. 1) in which the security CPU can store the data blocks is much larger than the memory (e.g., memory 140) on the smart card.

At 320, the security CPU can either receive the dynamically generated item key or not. Optionally, the security CPU can wait a certain amount of time for the dynamically generated item key to be transmitted from the smart card to the security CPU. If the dynamically generated item key is received, at 325 the security CPU can decrypt the blocks of data using the dynamically generated item key. If the amount of time passes without receiving the dynamically generated item key, the security CPU can optionally discard the encrypted blocks of data of the data item.

If the blocks of data are decrypted at 325, the security CPU can security check the data item at 330. The security check can be performed as described above with respect to 240 of FIG. 2. The security CPU can generate a hash using a cryptographic hashing algorithm to integrity check the data item. The security CPU can use the same cryptographic hashing algorithm and updating function of the full hash with partial hashes as used by the television service provider and the smart card. The security check can also include a signature check using a local public key stored in the trusted hardware area of the television receiver that can verify that the private key used to sign the data is at a trusted location (e.g., the smart card). The integrity check can ensure that the data item has not been tampered with since being transmitted from the smart card to the trusted hardware of the television receiver, that the data item is not otherwise corrupted, and that the data item is intended for the television receiver. Note that the integrity check can be performed either before or after the signature check of the data item. Additionally note that the order of the security check at 330 and the decrypting at 325 can be reversed.

The security CPU can determine at 335 whether the security check passed or failed. If the security check passed, the security CPU can execute the data item (e.g., software image) at 340. If the dynamically generated item key was never transmitted to the television receiver, the security check failed, or the data item was executed, the method 300 can end at 345.

FIG. 4 illustrates an embodiment of a satellite television distribution system 400. While a home automation system may be incorporated with various types of television receivers, various embodiments may be part of a satellite-based television distribution system. Cable, IP-based, wireless, and broadcast focused systems are also possible. Satellite television distribution system 400 may include: television service provider system 410, satellite transmitter equipment 420, satellites 430, satellite dish 440, television receiver 450, home automation service server 412, and display device 460. The display device 460 can be controlled by, for example, a user using a remote control device that can send wired or wireless signals to communicate with the television receiver 450 and/or display device 460. Alternate embodiments of satellite television distribution system 400 may include fewer or greater numbers of components. While only one satellite dish 440, television receiver 450, and display device 460 (collectively referred to as "user equipment") are illustrated, it should be understood that multiple (e.g., tens, thousands, millions of) instances and types of user equipment may receive data and television signals from television service provider system 410 via satellites 430.

Television service provider system 410 and satellite transmitter equipment 420 may be operated by a television service provider. A television service provider may distribute television channels, on-demand programming, programming information, and/or other content/services to users. Television service provider may also distribute software updates for television receiver 450. Television service provider system 410 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 420 may be used to transmit a feed of one or more television channels from television service provider system 410 to one or more satellites 430. While a single television service provider system 410 and satellite transmitter equipment 420 are illustrated as part of satellite television distribution system 400, it should be understood that multiple instances of transmitter equipment may be used, possibly scattered geographically, to communicate with satellites 430. Such multiple instances of satellite transmitting equipment may communicate with the same or with different satellites. Different television channels may be transmitted to satellites 430 from different instances of transmitting equipment. For instance, a different satellite dish of satellite transmitter equipment 420 may be used for communication with satellites in different orbital slots.

Satellites 430 may be configured to receive signals, such as streams of television channels or other data including software images for updating various television receivers, from one or more satellite uplinks such as satellite transmitter equipment 420. Satellites 430 may relay received signals from satellite transmitter equipment 420 (and/or other satellite transmitter equipment) to multiple instances of user equipment via transponder streams. Different frequencies may be used for uplink signals 470 from downlink signals 480. Satellites 430 may be in geosynchronous orbit.

Each of the transponder streams transmitted by satellites 430 may contain multiple television channels transmitted as packetized data. For example, a single transponder stream may be a serial digital packet stream containing multiple television channels. Therefore, packets for multiple television channels may be interspersed. Further, information used by television receiver 450 for home automation functions may also be relayed to a television receiver via one or more transponder streams. Further still, software images used to update television receiver 450 can be relayed to television receiver 450 via one or more transponder streams.

Multiple satellites 430 may be used to relay television channels or any other data such as information used for home automation or software images used to update television receiver 450 from television service provider system 410 to satellite dish 440. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 430a. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 440 may be a piece of user equipment that is used to receive transponder streams from one or more satellites, such as satellites 430. Satellite dish 440 may be provided to a subscriber for use on a subscription basis to receive television channels provided by the television service provider system 410, satellite transmitter equipment 420, and/or satellites 430. Satellite dish 440, which may include one or more low noise blocks ("LNBs"), may be configured to receive transponder streams from multiple satellites and/or multiple transponders of the same satellite. Satellite dish 440 may be configured to receive television channels via transponder streams on multiple frequencies. Based on the characteristics of television receiver 450 and/or satellite dish 440, it may only be possible to capture transponder streams from a limited number of transponders concurrently. For example, a tuner of television receiver 450 may only be able to tune to a single transponder stream from a transponder of a single satellite at a given time. The tuner can then be re-tuned to another transponder of the same or a different satellite. A television receiver 450 having multiple tuners may allow for multiple transponder streams to be received at the same time.

In communication with satellite dish 440 may be one or more television receivers. Television receivers may be configured to decode signals received from satellites 430 via satellite dish 440 for output and presentation via a display device, such as display device 460. A television receiver may be incorporated as part of a television or may be part of a separate device, commonly referred to as a set-top box ("STB"). Television receiver 450 may decode signals received via satellite dish 440 and provide an output to display device 460. On-demand content, such as PPV content, may be stored to a computer-readable storage medium. FIG. 1 provides additional detail of various embodiments of a television receiver. A television receiver is defined to include STBs, and also circuitry having similar functionality that may be incorporated with another device. For instance, circuitry similar to that of a television receiver may be incorporated as part of a television. As such, while FIG. 4 illustrates an embodiment of television receiver 450 as separate from display device 460, it should be understood that, in other embodiments, similar functions may be performed by a television receiver integrated with display device 460. Television receiver 450 may include home automation engine 411.

Display device 460 may be used to present video and/or audio decoded and output by television receiver 450. Television receiver 450 may also output a display of one or more interfaces to display device 460, such as an electronic programming guide ("EPG"). In many embodiments, display device 460 is a television. Display device 460 may also be a monitor, computer, or some other device configured to display video and, possibly, play audio.

Uplink signal 470a represents a signal between satellite transmitter equipment 420 and satellite 430a. Uplink signal 470b represents a signal between satellite transmitter equipment 420 and satellite 430b. Each of uplink signals 470 may contain streams of one or more different television channels. For example, uplink signal 470a may contain a first group of television channels, while uplink signal 470b contains a second group of television channels. Each of these television channels may be scrambled such that unauthorized persons are prevented from accessing the television channels. Uplink signals 470 can also contain other data as described herein, such as software images for updating television receiver 450.

Downlink signal 480a represents a signal between satellite 430a and satellite dish 440. Downlink signal 480b represents a signal between satellite 430b and satellite dish 440. Each of downlink signals 480 may contain one or more different television channels, which may be at least partially scrambled. A downlink signal may be in the form of a transponder stream. A single transponder stream may be tuned to at a given time by a tuner of a television receiver. For example, downlink signal 480a may be a first transponder stream containing a first group of television channels, while downlink signal 480b may be a second transponder stream containing a different group of television channels. In addition to or instead of containing television channels, a transponder stream can be used to transmit on-demand content to television receivers, including PPV content, which may be stored locally by the television receiver until output for presentation. Further, a transponder stream can contain other data as described herein, such as software images for updating television receiver 450.

FIG. 4 illustrates downlink signal 480a and downlink signal 480b, being received by satellite dish 440 and distributed to television receiver 450. For a first group of television channels, satellite dish 440 may receive downlink signal 480a and for a second group of channels, downlink signal 480b may be received. Television receiver 450 may decode the received transponder streams. As such, depending on which television channels are desired to be presented or stored, various transponder streams from various satellites may be received, descrambled, and decoded by television receiver 450. Further, television receiver 450 can control content as described in more detail in FIG. 1.

Network 490, which may include the Internet, may allow for bidirectional communication between television receiver 450 and television service provider system 410, such as for home automation related services provided by home automation service server 412. Although illustrated as part of the television service provider system, the home automation service server 412 may be provided by a third party in embodiments. In addition or in alternate to network 490, a telephone, e.g., landline, or cellular connection may be used to enable communication between television receiver 450 and television service provider system 410.

Figure 5:
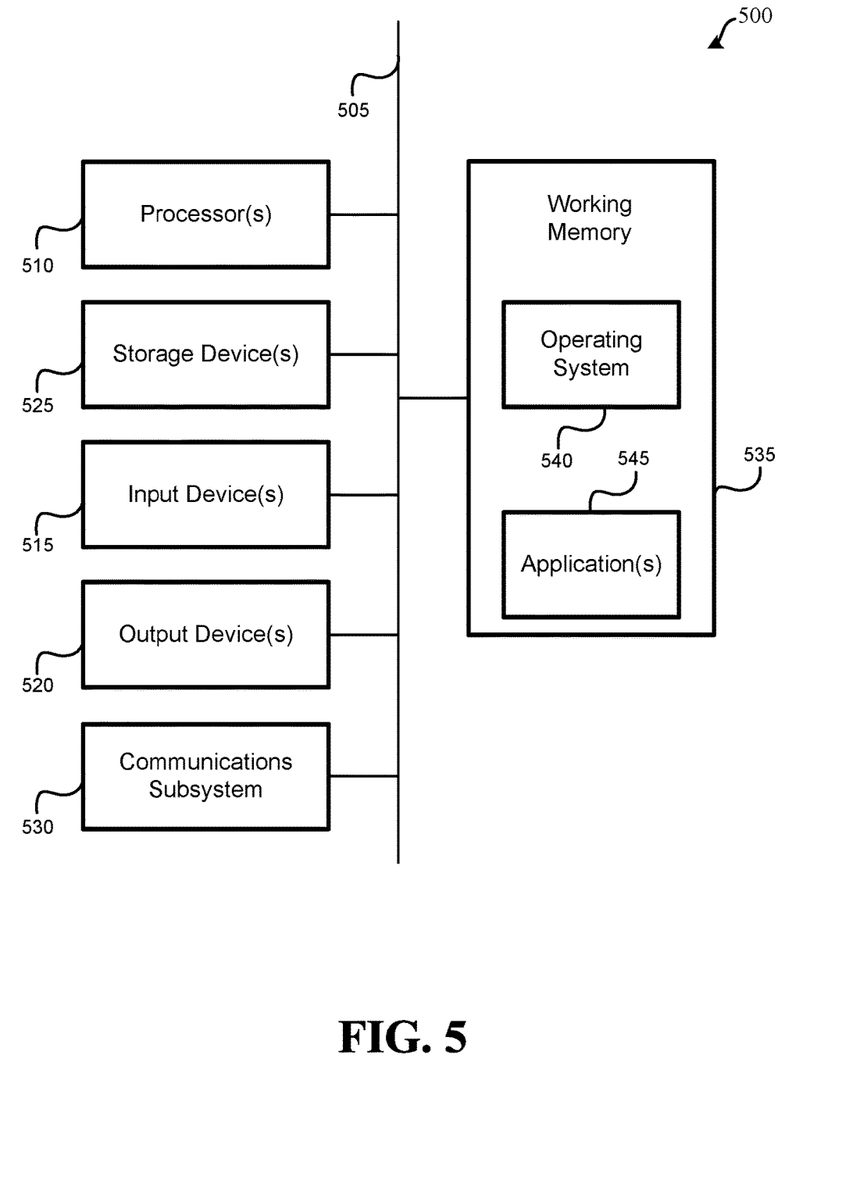
FIG. 5 illustrates an embodiment of a computer system.

FIG. 5 illustrates an embodiment of a computer system 500. A computer system 500 as illustrated in FIG. 5 may be incorporated into devices such as a television receiver (e.g., television receiver 105 of FIG. 1), DVR, television, media system, personal computer, and the like. FIG. 5 provides a schematic illustration of one embodiment of a computer system 500 that can perform some or all of the steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505, or may otherwise be in communication, as appropriate. The hardware elements may include one or more processors 510 (e.g., security CPU 120 and/or security CPU 135 of FIG. 1), including without limitation one or more general-purpose processors and/or one or more special-purpose processors such as digital signal processing chips, graphics acceleration processors, and/or the like; one or more input devices 515, which can include without limitation a mouse, a keyboard, a camera, a remote control, and/or the like; and one or more output devices 520, which can include without limitation a display device, a printer, and/or the like.

The computer system 500 may further include and/or be in communication with one or more non-transitory storage devices 525 (e.g., memory 140 and/or memory 125 of FIG. 1), which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset such as a Bluetooth™ device, an 802.11 device, a Wi-Fi device, a WiMax device, cellular communication facilities, etc., and/or the like. The communications subsystem 530 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 530. In other embodiments, a portable electronic device, may be incorporated into the computer system 500 (e.g., an electronic device or STB), as an input device 515. In many embodiments, the computer system 500 will further comprise a working memory 535, which can include a RAM or ROM device, as described above. Memory 125 of FIG. 1 can include a working memory.

The computer system 500 also can include software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 2 or 3, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 525 described above. In some cases, the storage medium might be incorporated within a computer system, such as computer system 500. In other embodiments, the storage medium might be separate from a computer system (e.g., a removable medium), such as a compact disc, and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 500 to perform methods in accordance with various embodiments of the technology. According to a set of embodiments, some or all of the procedures of such methods are performed by the computer system 500 in response to processor 510 executing one or more sequences of one or more instructions, which might be incorporated into the operating system 540 and/or other code, such as an application program 545, contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 and/or components thereof generally will receive signals, and the bus 505 then might carry the signals and/or the data, instructions, etc. carried by the signals to the working memory 535, from which the processor(s) 510 retrieves and executes the instructions. The instructions received by the working memory 535 may optionally be stored on a non-transitory storage device 525 either before or after execution by the processor(s) 510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method, comprising:
   receiving, by a smart card, a plurality of blocks of data comprising a data item;
   processing, by the smart card, each block of data of the plurality of blocks of data, wherein the processing comprises:
      decrypting the block of data with a global network key,
      calculating a partial hash, the partial hash being a hash of a portion of the data item comprised by the block of data,
      updating a full hash with the partial hash,
      encrypting the block of data with a dynamically generated item key, and
      transmitting the block of data encrypted with the dynamically generated item key to a television receiver;
   upon processing the plurality of blocks of data, such that the full hash is a hash of the data item, security checking, by the smart card, the data item including an integrity check based on the full hash; and
   transmitting, by the smart card, the dynamically generated item key to the television receiver only if the security check passed.

2. The method of claim 1, wherein the data item is a software image.

3. The method of claim 2, wherein the processing each block of data of the plurality of blocks of data further comprises:
   determining, by the smart card, that the software image is a most recent version.

4. The method of claim 2, wherein the security check comprises checking that the software image is intended for the television receiver.

5. The method of claim 1, further comprising:
   discarding, by the smart card, the dynamically generated item key without transmitting the dynamically generated item key to the television receiver if the security check failed.

6. The method of claim 1, wherein the security check comprises a signature check that the data item is from a known source.

7. The method of claim 1, wherein the integrity check confirms that the data item has not been tampered with.

8. The method of claim 1, wherein the plurality of blocks of data are received one block at a time and each block of data is processed before receiving the next block.

9. The method of claim 1, wherein two or more of the plurality of blocks of data are processed in parallel.

10. A computer-readable memory device having stored thereon instructions that, when executed by a processor, cause the processor to:
    receive a plurality of blocks of data comprising a data item;
    process each block of data of the plurality of blocks of data, wherein the processing comprises:
       decrypting the block of data with a global network key,
       calculating a partial hash, the partial hash being a hash of a portion of the data item comprised by the block of data,
       updating a full hash with the partial hash,
       encrypting the block of data with a dynamically generated item key, and
       transmitting the block of data encrypted with the dynamically generated item key to a television receiver;
    upon processing the plurality of blocks of data, such that the full hash is a hash of the data item, security check the data item including an integrity check based on the full hash; and
    transmit the dynamically generated item key to the television receiver only if the security check passed.

11. The computer-readable memory device of claim 10, wherein the data item is a software image.

12. The computer-readable memory device of claim 11, wherein the processing each block of data of the plurality of blocks of data further comprises:
    determine that the software image is a most recent version.

13. The computer-readable memory device of claim 11, wherein the security check comprises checking that the software image is intended for the television receiver.

14. The computer-readable memory device of claim 10, wherein the instructions comprise further instructions that, when executed by the processor cause the processor to:
    discard the dynamically generated item key without transmitting the dynamically generated item key to the television receiver if the security check failed.

15. The computer-readable memory device of claim 10, wherein the security check comprises a signature check that the data item is from a known source.

16. The computer-readable memory device of claim 10, wherein the integrity check confirms that the data item has not been tampered with.

17. The computer-readable memory device of claim 10, wherein the plurality of blocks of data are received one block at a time and each block of data is processed before receiving the next block.

18. The computer-readable memory device of claim 10, wherein two or more of the plurality of blocks of data are processed in parallel.

19. A system, comprising:
- a television receiver comprising a first trusted security processor and a receiving slot;
- a television service broadcast system; and
- a smart card, wherein the smart card is coupled to the television receiver via the receiving slot, the smart card comprising:
  - a second trusted security processor, and
  - a memory storing instructions that, when executed by the second trusted security processor, cause the second trusted security processor to:
    - receive, from the television service broadcast system, a plurality of blocks of data comprising a software image, wherein the plurality of blocks of data are received one block at a time and each block of data is processed before receiving the next block;
    - process each block of data of the plurality of blocks of data, wherein the processing comprises:
      - decrypting the block of data with a global network key,
      - generating a partial hash representing the block of data, the partial hash being a hash of a portion of the software image comprised by the block of data,
      - updating a software image hash with the partial hash,
      - encrypting the block of data with a dynamically generated item key, and
      - transmitting the block of data encrypted with the dynamically generated item key to the television receiver;
    - upon processing the plurality of blocks of data, such that the full hash is a hash of the software image, security check the software image including an integrity check based on the software image hash; and
    - transmit the dynamically generated item key to the first trusted security processor of the television receiver only if the security check passed.

20. The system of claim 19, wherein the memory has stored further instructions that, when executed by the second trusted security processor, cause the second trusted security processor to:
- discard the dynamically generated item key without transmitting the dynamically generated item key to the first trusted security processor of the television receiver if the security check failed.

* * * * *